June 29, 1954  M. E. AMES ET AL  2,682,114
RAKER GAUGE FOR CIRCULAR SAWS
Filed May 3, 1952
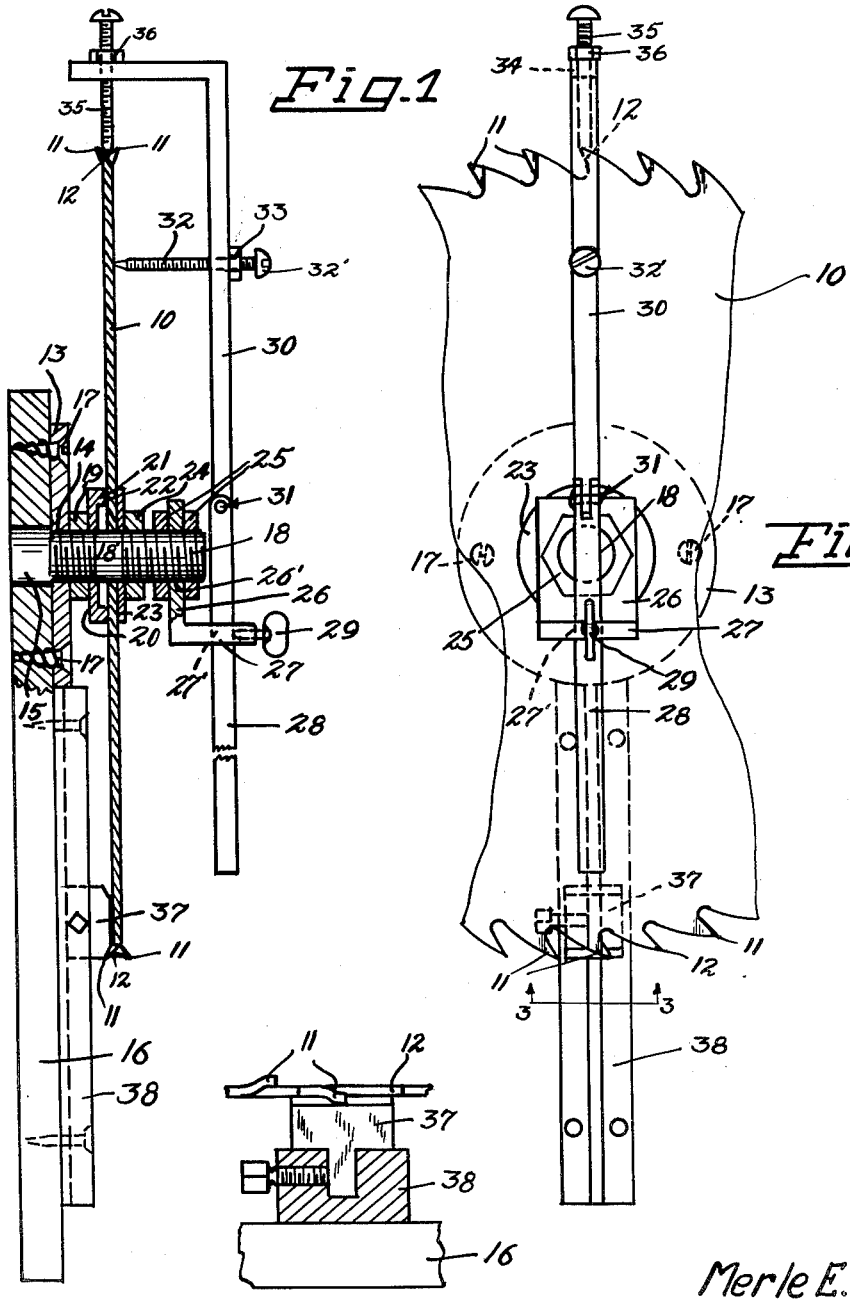
Merle E. Ames
Rolland C. Ames
INVENTOR.
BY
*Glenn L. Fish*
ATTORNEY Patented June 29, 1954

2,682,114

UNITED STATES PATENT OFFICE 2,682,114

RAKER GAUGE FOR CIRCULAR SAWS

Merle E. Ames and Rolland C. Ames,
Dover, Idaho

Application May 3, 1952, Serial No. 285,968

1 Claim. (Cl. 33—202)

Our present invention relates to hand tools and more particularly to a raker gauge for circular saws.

One object of the invention lies in the provision of a vise and gauge adapted to receive single circular saws of various dimensions and secure them for frictional rotation and simultaneously gauge the length of the raker teeth of the saw.

Another object of the invention lies in the provision of a raker gauge which is radially adjustable with respect to the saw receiving axle whereby the tool may be used for saws of different diameters.

Another object of the invention lies in the provision of a hinged gauge bar which may be tilted away from the saw during the raker filling operation and back again for measuring or gauging the raker filed, thus eliminating the necessity of disturbing the gauge setting during the raker filing operation of a saw.

Another object of the invention lies in the provision of a raker gauge which has a novel frictional vise for clamping a saw for frictional axial rotation.

Another object of the invention lies in the provision of a raker gauge which while admirably suited for its purpose is inexpensive to manufacture and not liable to get out of working order.

These and other objects of the invention will be apparent during the course of the following description.

In the accompanying drawings, forming a part of this specification, and wherein like numerals are employed to designate like parts, Figure 1 is a view partially in side elevation and partially in vertical cross section and showing the preferred embodiment of our invention;

Figure 2 is a front elevation of the invention; and,

Figure 3 is a view as at line 3—3 of Figure 2.

Referring now more particularly to the drawing, we have shown a circular saw 10 having cutting teeth 11 and raker teeth 12. As shown in Figure 3, the cutting teeth 11 are set or swaged while the raker teeth 12 are not. To make the saw function properly and give a good smooth cut, all of the cutting teeth should be sharp and of the same length and all of the raker teeth should be somewhat shorter than the cutting teeth, but of the same length with relation to each other. For our purpose we have found that raker teeth which are 1/64 inch shorter than the cutting teeth give satisfactory results. However, this amount may vary according to the desire of the individual and the conditions under which the saw will operate.

In practice we have found the saw easier to handle when positioned in a vertical plane and have accordingly disclosed the invention, but it will be understood that the position of the saw is not of great importance except with relation to the several elements of the raker gauge.

A supporting plate 13, which is circular in front elevation, is provided with a concentric internally threaded aperture 14 and this aperture is axially aligned with a bore 15 formed horizontally through the tool support 16. Counter sunk screws 17 are employed to secure the plate 13 to the support 16.

A stud bolt 18 has one threaded end engaged in aperture 14 and is removably locked therein by means of lock nut 19. Stud bolt 18 thus forms an axle and is also provided with a smooth, unthreaded bearing surface 18' intermediate its threaded ends.

A circular disc 20 is provided with an angular protuberance 21 on one side face and the top of the protuberance is surfaced to form a friction face 22 upon which the side face of saw 10 bears. The disc 20 has a central opening and is slipped over the bolt 18 on the inner side of the saw with its face 22 disposed outwardly against the saw. Outwardly of the saw 10 a pressure disc 23 is provided and it also has a central opening and is mounted encircling bolt 18. A clamping nut 24 is threaded on the outer end of bolt 18 and tightened sufficiently to secure the saw and yet permit its frictional rotation between the friction disc face 22 and pressure disc 23 when it is desired to gauge successive raker teeth.

Outside of the clamping nut 24 and between two other clamping nuts 25—25 threaded on the outer end of bolt 18, an angle bracket 26, having an aperture 26' through which bolt 18 extends, is secured. The angle bracket has a finger 27 which is disposed parallel with the axis of bolt 18 and is drilled so that the projection of the axis of the drilled hole 27' is at right angles to the projected axis of bolt 18. A rod 28 extends through drilled hole 27' and a set bolt 29, threaded axially through finger 27 communicates with hole 27' and releasably secures rod 28 for selective vertical adjustment.

At the upper end of rod 28 a gauge bar 30 is hingedly united, as at 31, and thus is adapted for vertical tilting movement. A spacing screw 32 is threadedly engaged through bar 30 and on an axis parallel to the axis of bolt 18 and with its kerfed head 32' disposed outwardly. A lock nut 33 secures the screw in selected positions for spacing the vertical portion of gauge bar 30 from the outer side face of the saw 10.

At the upper end of bar 30 a horizontally disposed arm 34 is provided and this extends inwardly parallel with screw 32 and over the toothed edge of saw 10. A gauge screw 35 is threadedly engaged through arm 34 and is adapted to bear against the raker teeth of saw 10. A lock nut 36 releasably secures the screw in selective adjusted positions.

It thus can be seen that one may set the gauge screw 35 to the desired setting and then file each successive raker tooth to correspond to the setting. To facilitate accurate adjustment of the gauge screw 35, it may be provided with an accurate thread which will cause it to shift $\frac{1}{32}$ of an inch with each complete revolution. However, this is not necessary to the acceptable performance of the device.

A radially adjustable anvil block 37 is provided on channel 38 secured to support 16 to facilitate swaging the cutting teeth of the saw, thus making a complete saw sharpening tool of the device.

Obviously, individual saws will have a central aperture which is apt to differ in size and/or shape from others. Therefore we provide adaptors (not shown) having a bore to fit the bearing surface 24 of bolt 18 and outer configurations adapted to receive the saw aperture corresponding in shape.

Having thus described our invention, we claim:

A raker tooth gauge for circular saws comprising a supporting plate removably secured to a tool support and having an internally threaded concentric aperture axially aligned with a bore in said tool support, said bore having a larger diameter than said aperture; a stud bolt having external threads on its ends and an intermediate bearing surface having one end threaded into said supporting plate aperture; a lock nut threaded on the stud bolt for securing said bolt against movement relative to said supporting plate; a circular disk having a concentric opening encircling said stud bolt, said disk having an axially extending annular protuberance at its peripheral edge and constituting a friction face against which the side face of a circular saw mounted on said stud bolt bears; a pressure disk having a concentric opening encircling said stud bolt and disposed on the opposite side of said saw from said first disk, said lock nut serving as a spacer to position said saw and opposed disks on the intermediate portion of said stud bolt; an angle bracket secured on the outer free end of said stud bolt and having a finger disposed in spaced parallel relation to the axis of said stud bolt, a hole in said finger having a hold disposed with its axis projection extending diametrically across the end face of said stud bolt; an elongated rod extending through the hole of said finger and secured therein for movement to selective adjusted positions diametrically of said stud bolt; a gauge bar hingedly united with said rod at one end and a gauge carried by said bar and adapted to bear against raker teeth of said saw.

References Cited in the file of this patent

UNITED STATES PATENTS

| Number | Name | Date |
| --- | --- | --- |
| 83,524 | Miller | Oct. 27, 1868 |
| 237,590 | Pierson | Feb. 8, 1881 |
| 890,727 | Todd | June 16, 1908 |
| 2,463,007 | Wheeler | Mar. 1, 1949 |
| 2,488,684 | Rex | Nov. 22, 1949 |
| 2,493,850 | Blackmon | Jan. 10, 1950 |
| 2,545,784 | Kenner | Mar. 20, 1951 |